(12) United States Patent
Joong et al.

(10) Patent No.: US 7,554,942 B2
(45) Date of Patent: Jun. 30, 2009

(54) GEOGRAPHICAL RESTRICTION OF SERVICES IN A PACKET DATA TELECOMMUNICATIONS NETWORK

(75) Inventors: Donald Joong, Montreal (CA); Shohreh Savoli, Dollard des Ormeaux (CA); Hung Tran, Town of Mount Royal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 435 days.

(21) Appl. No.: 11/395,201

(22) Filed: Apr. 3, 2006

(65) Prior Publication Data
US 2007/0230440 A1    Oct. 4, 2007

(51) Int. Cl.
*H04Q 7/00* (2006.01)
(52) U.S. Cl. .................... 370/328; 455/432.1; 455/433; 455/435.1
(58) Field of Classification Search ........................ None
See application file for complete search history.

(56) References Cited

U.S. PATENT DOCUMENTS

| | | | |
|---|---|---|---|
| 6,230,017 B1 | 5/2001 | Andersson et al. | 455/456 |
| 6,769,000 B1 * | 7/2004 | Akhtar et al. | 707/103 R |
| 6,925,297 B2 * | 8/2005 | Wenzel | 455/411 |
| 7,411,927 B1 * | 8/2008 | Bhalla et al. | 370/331 |
| 2004/0022212 A1 * | 2/2004 | Chowdhury et al. | 370/329 |
| 2005/0102529 A1 * | 5/2005 | Buddhikot et al. | 713/200 |
| 2005/0130627 A1 * | 6/2005 | Calmels et al. | 455/411 |
| 2005/0201324 A1 * | 9/2005 | Zheng | 370/328 |
| 2007/0054686 A1 * | 3/2007 | Allen et al. | 455/518 |
| 2007/0208864 A1 * | 9/2007 | Flynn et al. | 709/227 |

FOREIGN PATENT DOCUMENTS

WO    WO 2004/080092    9/2004

* cited by examiner

*Primary Examiner*—Ajit Patel

(57) ABSTRACT

A method and a Packet Data Service Node (PDSN) of restricting geographical use of a service for a mobile terminal (MT) in a packet data telecommunications network. The PDSN receives from an access node (AN), a registration request message having a cell information for requesting. The PDSN translates the cell information into a zone ID, stores the zone ID in a first table and sends to a AAA server, an access request message for authenticating the MT. PDSN further receives from the AAA server, an access accept message for authorizing the MT to receive packet data service, wherein the access accept message includes an allowance information. Afterwards the PDSN compares the allowance information with the zone ID. If the allowance information is different from the zone ID in the first table, the PDSN set up a filter for the MT and rejects packet data for the requested packet data service.

13 Claims, 5 Drawing Sheets

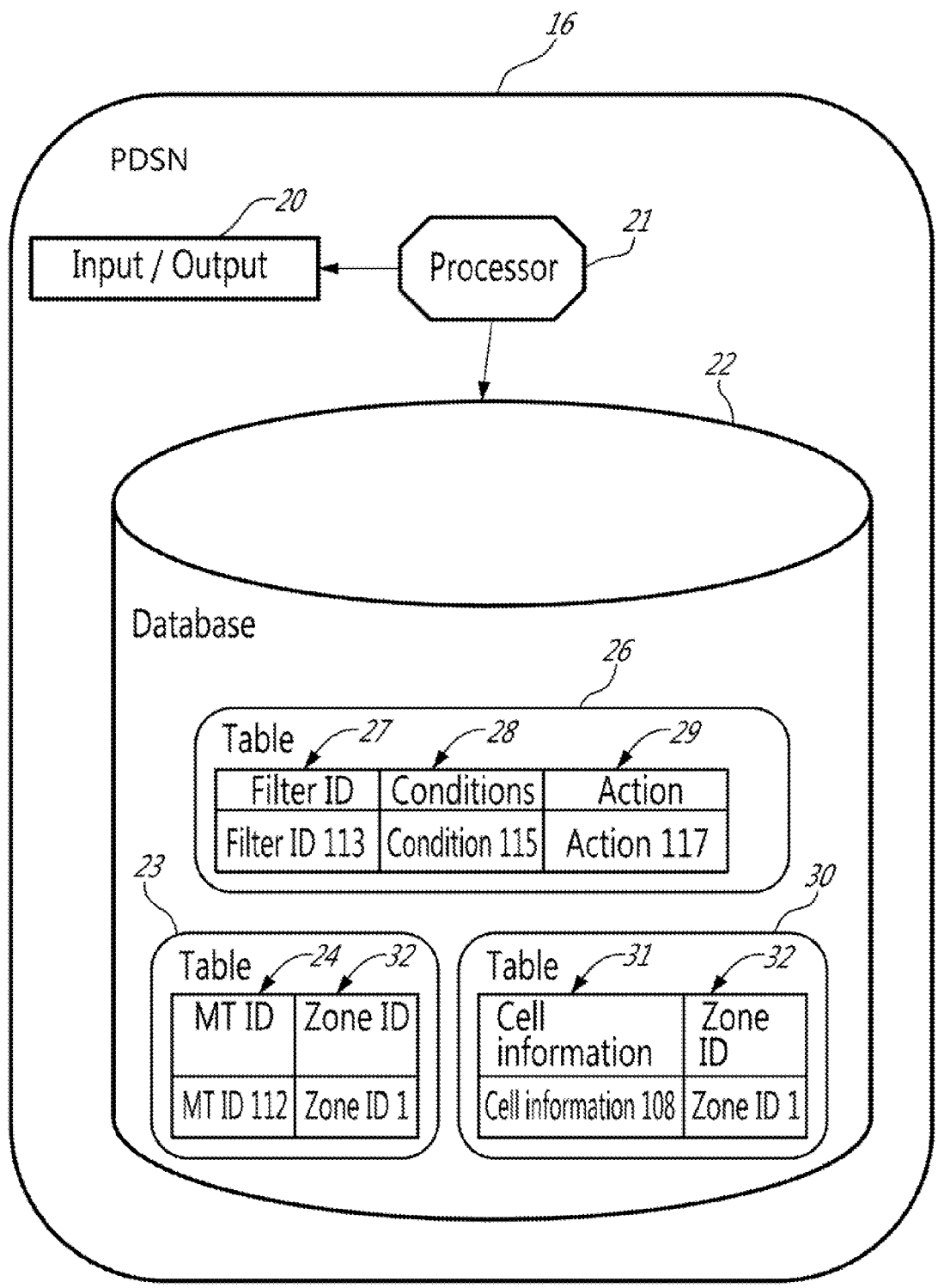

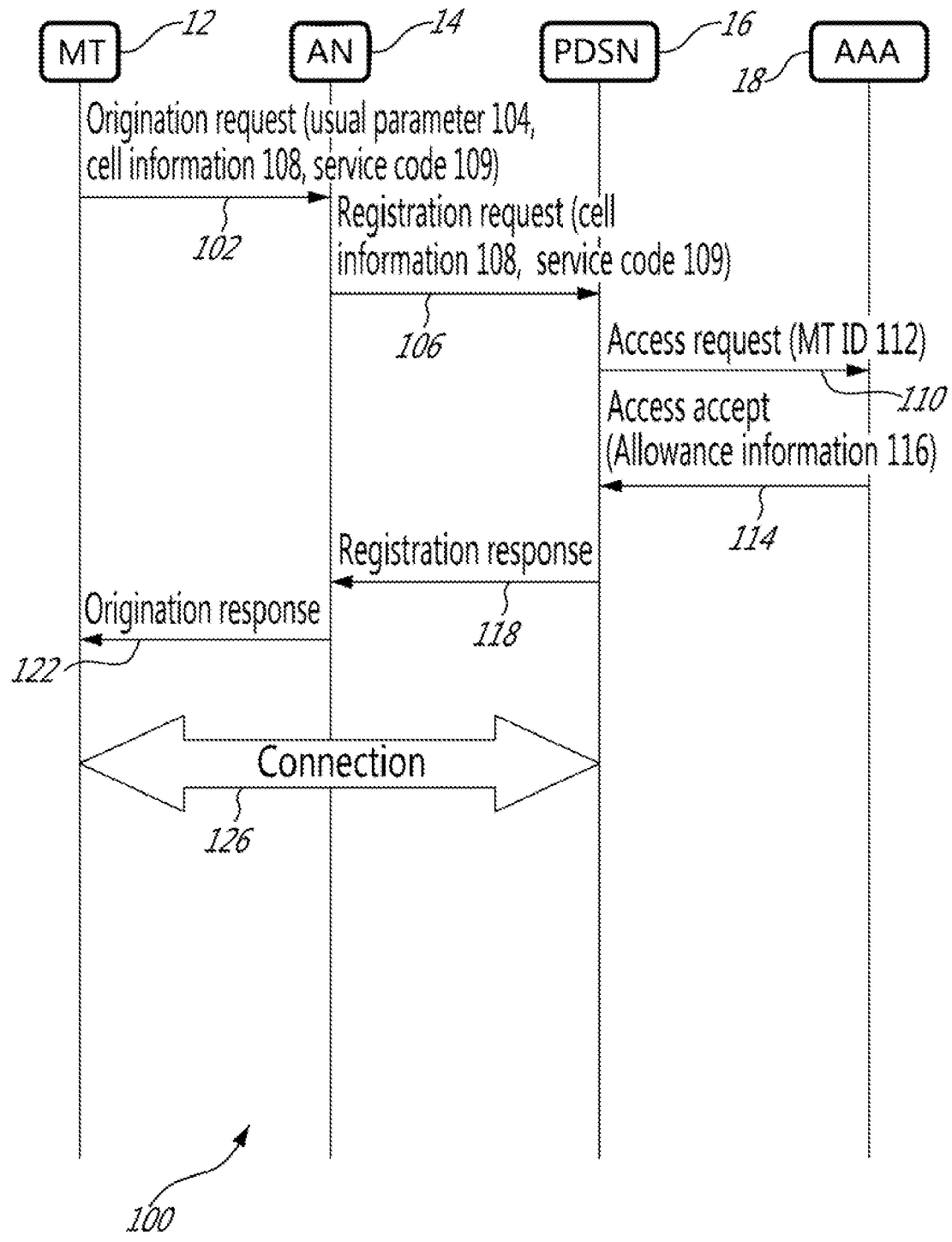

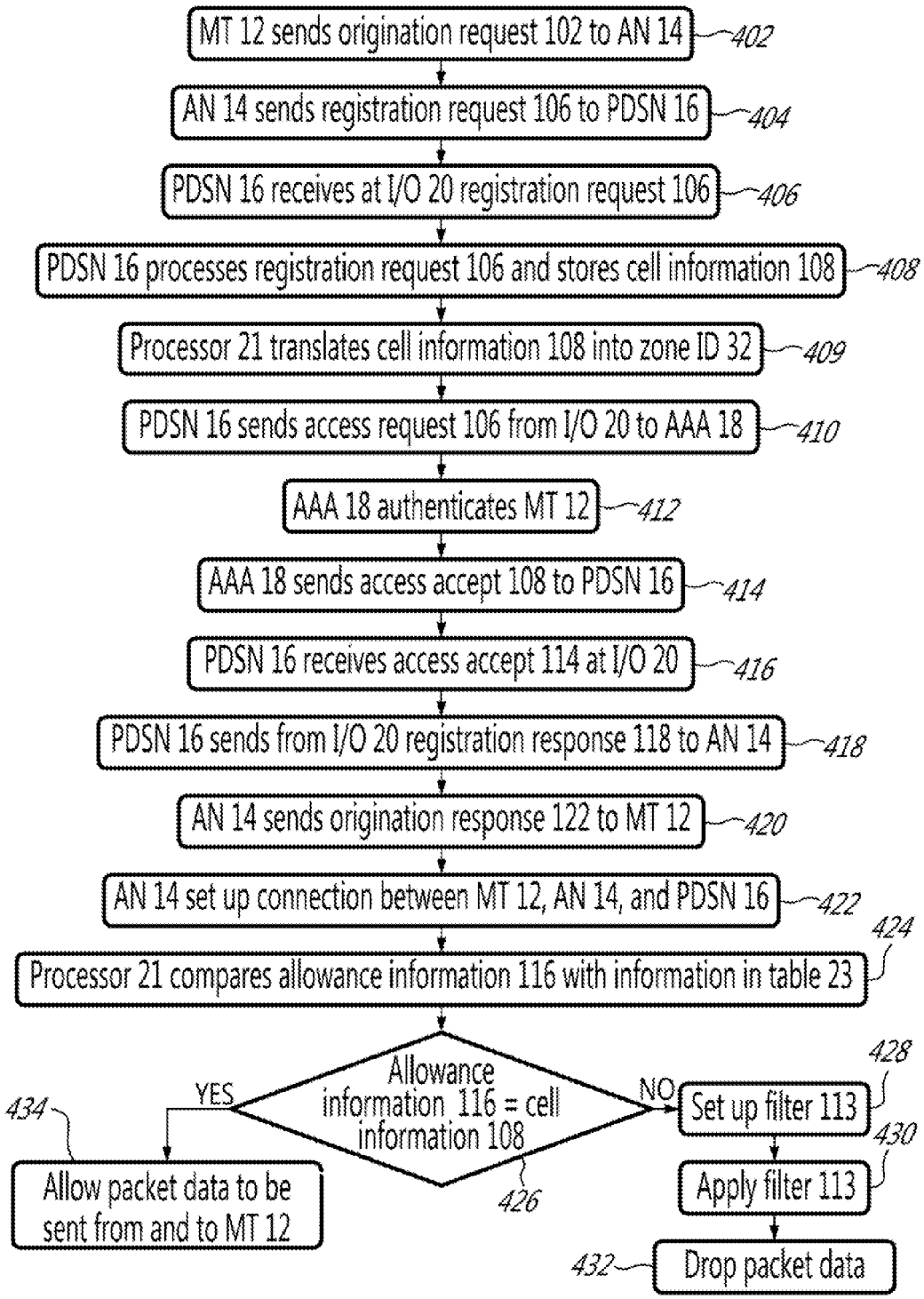

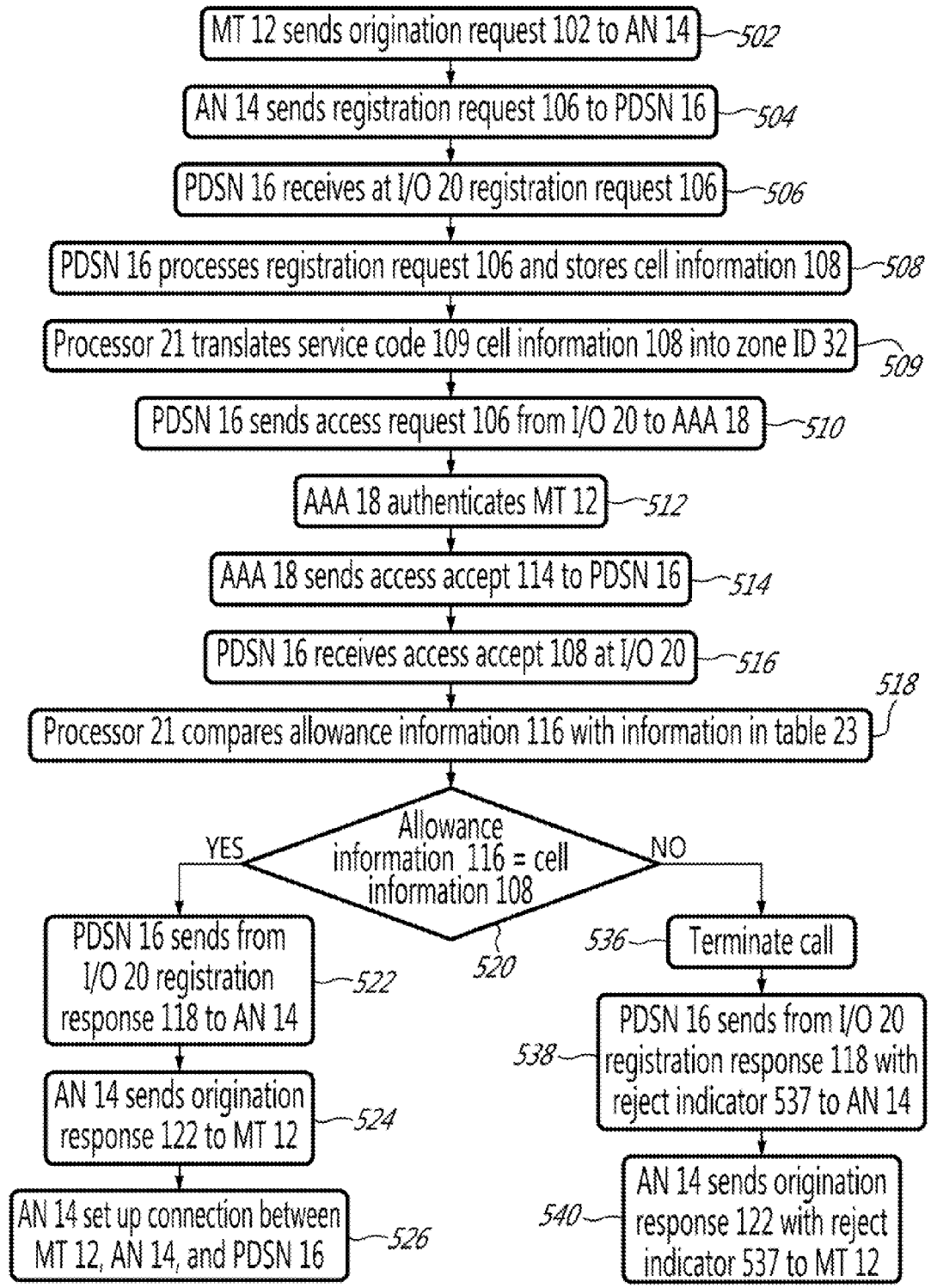

GEOGRAPHICAL RESTRICTION OF SERVICES IN A PACKET DATA TELECOMMUNICATIONS NETWORK

TECHNICAL FIELD

The invention relates to the field of telecommunications, and particularly to a geographical restriction of services in a packet data telecommunications network.

BACKGROUND

Mobile Terminal (MT) subscribers increasingly rely on their MT for their communication and organizational needs. More recently, Push-to-Talk (PTT) technology over a cellular network, a Voice-Over IP (VoIP) network such as Session Initiated Protocol (SIP), or a Wireless Local Area Network (WLAN) has provided even more options for personal communications among groups of users. PTT provides users with instantaneous connections that bypass some of the more rigorous call establishment procedures associated with traditional MT calls.

Push-To-Talk (PTT) technology allows point-to-multipoint communications between users. Transmissions are usually half-duplex, and require a user to press and hold a button on the wireless communications device while speaking into a microphone. PTT is a technology that is most often associated with private radio systems and an operator of such radio systems may be interested in restricting MTs from PTT access on its network.

In a telecommunications network, certain information concerning a mobile station is stored in a home location register (HLR). The HLR is a database used to store and manage subscription information for mobile subscribers belonging to a specific telecommunications operator. A telephone company or telephone service provider is an example of what is meant by "telecommunications operator". Typically, an HLR stores data about subscribers, including subscriber's Mobile Station International Subscriber Directory Number (MSISDN), International Mobile Subscriber Identity (IMSI), supplementary services, location information, and authentication parameters. The HLR may additionally store restriction information for limiting the subscriber's use of the MT to a specified geographical area. For example, the service may be restricted to one or more allowed cells. A service may be for a determination in which cells the MT can receives and originates calls. In particular, the MT is permitted to operate only in cells identified in the subscriber's record in the HLR. Thus, only applicable cells listed in the subscriber's record are paged when a call is directed to the mobile station, and the MT can only originate calls and sustain calls from such cells. Furthermore, calls originated and terminated by the mobile station calls in the applicable cells listed in the subscriber's record can be sustained when the mobile station travels into non-applicable cells.

Traditionally the radio transmissions of each Access Node (AN) of a telecommunications network cover a geographical area, e.g., one or more "cells". A predetermined number of cells typically form a location area. When an active MT travels from an old cell to a new cell, a handoff or handover must occur from the access node handling the old cell to the access node handling the new cell. A MT in an idle mode can move or "roam" from an old cell to a new cell, and even change location areas.

Each access node is connected to one MSC 30. Typically, each MSC is connected to and serves a plurality of access nodes. The MSC is responsible for switching functions related to call processing for calls originated from and destined to a mobile station. Each MSC interfaces with access nodes which its serves, as well as interfacing with other switching stations. In particular, each MSC connects to non-mobile switching centers through a gateway mobile switching center (GMSC).

As the MT roams into a location area that is handled by a different MSC, a location update operation must occur so that both the HLR and the visitor location register (VLR), typically at a mobile switching center (MSC), have appropriate current information about the MT and its whereabouts. In this regard, when a MT roams into an area having a different location identifier, a forced registration typically occurs. In the forced registration, the HLR is updated regarding the particular MSC now serving the MT. The VLR is a database which contains information about MTs current location in the geographical area serviced by an associated MSC.

When the MT travels into an allowed cell of new location area, the geographical restriction information for the mobile subscriber is transmitted to the VLR. Using the geographical restriction information for the mobile subscriber stored at the VLR, the MSC currently handling the MT determines whether calls can be completed and processed. Roaming attempts outside the area of geographical restriction are permitted so that whereabouts of the MT can be monitored and maintained. However, except for soft restrictions, attempts to originate calls outside the area of geographical restriction are rejected. A geographical restriction may be based upon city or country borders. This method works fine for geographic restriction of services like PTT in a network comprising an HLR.

However, in a third generation (3G) telecommunication network or International Mobile Telecommunications-2000 (IMT 2000) like a Code Division Multiple Access 2000 First Evolution-Data Only (CDMA2000 1x EV-DO) there is no HLR and no MSC in the call chain. The CDMA2000 1x EV DO network rather comprises an access node (AN), a packet data service node (PDSN) and an AAA server for providing packet data service to a user of a MT. Thus, a subscriber profile lies in an AAA server. Therefore, in a CDMA2000 1x EV-DO network, there is no mechanism for an operator to restrict the use of PTT service in accordance to the geographic location of the mobile station.

For that reason, there is a need to provide a solution to prevent a MT to receive PTT service in a packet data telecommunications network. The invention provides a solution to this problem.

SUMMARY

It is a broad aspect of the present invention to provide a method of restricting geographical use of a service for a mobile terminal (MT) in a packet data network, the method comprising the steps of:

receiving, at a packet data service node (PDSN) from an access node (AN), a registration request message for requesting packet data service, wherein the registration request includes a cell information;

translating, at the PDSN, the cell information into a zone ID;

storing, at the PDSN, the zone ID, wherein the zone ID is stored in a first table;

sending, from the PDSN to an Authentication, Authorization, Accounting (AAA) server, an access request message for authenticating the MT;

receiving, at the PDSN from the AAA server, an access accept message for authorizing the MT to receive packet data service, wherein the access accept message includes an allowance information;

comparing, at the PDSN, the allowance information with the zone ID:
if the allowance information is different from the zone ID in the first table:
setting up, at the PDSN, a filter for the MT; and
rejecting, at the PDSN, the packet data for the requested packet data service.

It is another broad aspect of the present invention to provide a Packet Date Service Node (PDSN) for providing packet data service to a Mobile terminal in a packet data network, wherein the PDSN comprises:

an Input/Output unit for receiving a registration request message for requesting packet data service, wherein the registration request includes a cell information, receiving an access accept message for authorizing the MT to receive packet data service, wherein the access accept message includes an allowance information;

a processor for translating the cell information into a zone ID, comparing, at the PDSN, the allowance information with the zone ID and if the allowance information is different from the zone ID in the first table the processor set up a filter for the MT and reject the packet data for the requested packet data service; and a database for storing the zone ID in a first table.

BRIEF DESCRIPTION OF THE DRAWINGS

The foregoing and other aspects, features, and advantages of the invention will be apparent from the following more particular detailed description as illustrated in the accompanying drawings in which reference characters refer to the same parts throughout the various views. The drawings are not necessarily to scale, emphasis instead being placed upon illustrating the principles of the invention.

FIG. 2 illustrates a Packet Data Service Node (PDSN) for providing packet data service to a MT in accordance to the invention;

FIG. 3 is a nodal operation and signal flow diagram illustrating a flow of messages for restricting geographical use of a packet data service for an unauthorized MT in a packet data telecommunications network in accordance to the invention;

FIG. 4 is a flow chart of the steps of the method for restricting geographical use of a packet data service in the packet data telecommunications network for an unauthorized MT in accordance to a first embodiment of the invention; and FIG. 5 is a flow chart of the steps of the method for restricting geographical use of a packet data service in the packet data telecommunications network for an unauthorized MT in accordance to a second embodiment of the invention.

DETAILED DESCRIPTION

Figure 1:
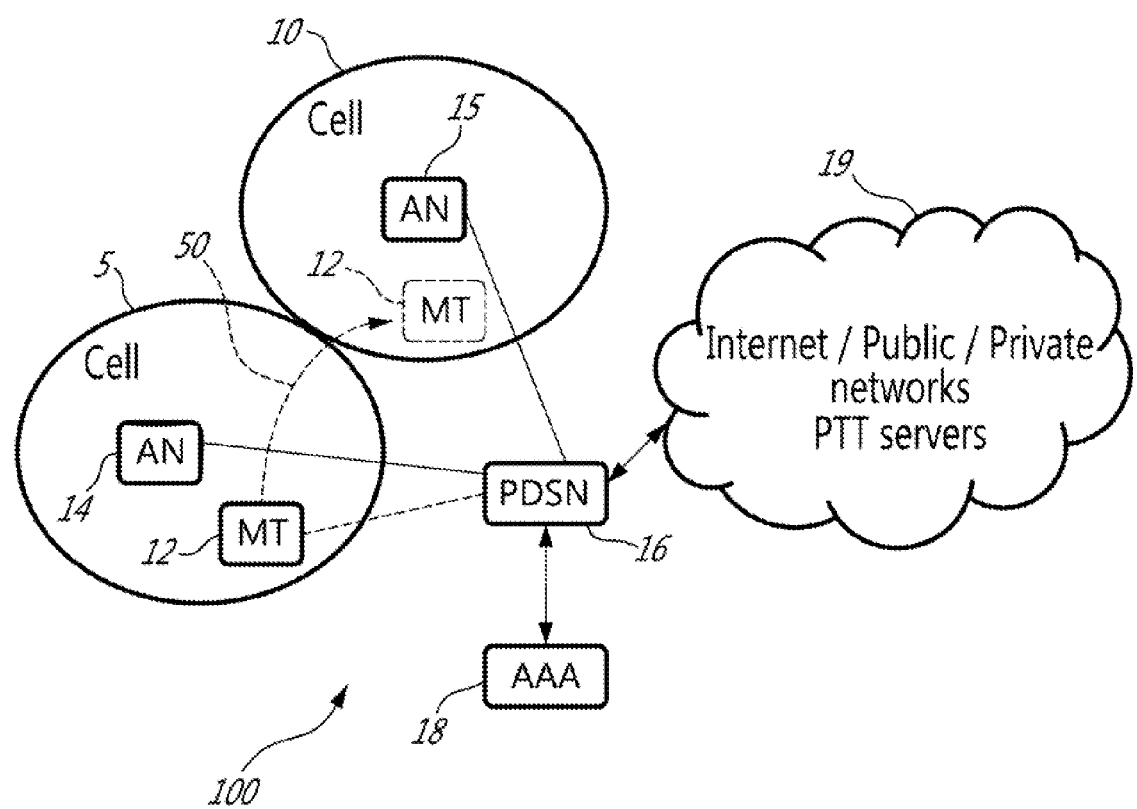
FIG. 1 is a schematic diagram illustrating a packet data telecommunication network for providing packet data services to a roaming Mobile Terminal (MT) in accordance to the invention.

In the following description, for purposes of explanation and not limitation, specific details are set forth such as particular architectures, interfaces, techniques. In order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Reference is now made to FIG. 1, which is a schematic diagram illustrating a packet data telecommunication network 100 for providing packet data services to a roaming Mobile Terminal (MT) 12 in accordance to the invention. The packet data telecommunication network 100 may be any network that provides packet data services to the roaming MT 12. The MT 12 can be any mobile equipment that is adapted to receive packet data services such as Push-To-Talk (PTT) services to the MT 12.

In particular, the MT 12 refers to a device that can operate is operable on a cellular network, a Voice-Over IP (VoIP) network such as Session Initiated Protocol (SIP), or a Wireless Local Area Network (WLAN) using an 802.11x protocol, or any combination thereof. The 802.11x is defined by the Institute of Electrical and Electronics Engineers (IEEE). It can be understood that the present invention is not limited to the providing PTT services, and it should be clear that any packet data service that can be provided by the present network 100 is also encompassed.

The present invention preferably refers to a packet data network 100 being a Code Division Multiple Access 2000 1X EV-DO (CDMA2000 1x EV-DO). The CDMA2000 1x EV-DO is described in IS-835 as published in January 2005 by Telecommunications Industry Association/Electronic Industries Alliance (TIA/EIA). In general, the packet data network 100 may be any 2G network such as in a Time Division Multiple Access (TDMA) network or a Code Division Multiple Access (CDMA), 2.5G networks such as a General Packet Radio Service (GPRS) any 3G Universal Mobile Telecommunications Systems (3G UMTS) network such as a CDMA2000 network, a Wideband Code Division Multiple Access (WCDMA) network, a Global System for Mobile Communications/Enhanced Data for GSM Evolution (GSM/EDGE) or a High Speed Packet Data Access (HSPDA) network. For example, an Access Node (AN) may be a Base station or any Access point as described in the 802.11x protocol.

The network 100 is divided into packet data zones or cells in which the MT 12 may roam. In FIG. 1, the MT 12 roams from a first cell 5 to a second cell 10 along line 50 and request packet data services to a Packet Data Service Node 16. A cell is defined as an area served by an Access Node (AN). It can be understood that the network 100 is a simplified network and that the network 100 may comprise more than the two of the illustrated packet data cell 5 and 10.

Each packet data cell 5 and 10 comprises an AN for providing radio access over the air interface to MTs in the zone coverage of the packet zone. Cells 5 and 10 are covered by AN 14 and 15 respectively.

The AN 14 and 15 are connected to a Packet Data Service Node (PDSN) 16, which acts as a Gateway Node and Access server between the Internet, Public/Private networks/PTT servers 19 and the MT 12 and any MT connected to an AN of the network 100. The PDSN 16 interacts with an Authentication, Authorization, and Accounting (AAA) server 18 for authenticating and authorizing the MT 12 to access the Internet, Public/Private networks 19. The AAA server 18 authenticates and authorizes the MT 12 to operate in the network 100. The AAA further provides user profile information to the PDSN 16 and stores accounting data regarding registered MTs in its network. A profile may contain subscribers' number service classes and filters.

Reference is now made to FIG. 2, which illustrates the PDSN 16 in accordance to the invention. The PDSN 16 comprises an input/output (I/O) unit 20 for receiving information from the network 100 and for sending information to the network 200, a processor 21 for operating the PDSN 16, a database 22 for storing information that can be accessed by the processor 21. The database 22 may be any persistent memory like a Read-Only Memory (ROM), a Structured Query Language (SQL) database or a Flash memory. The processor 21 can be hardware, software, or any combination thereof. The database 22 comprises a first table 30 that correlates cell information 31 like AN IP address and a zone ID parameter 32 which may be an AAA server zone identifier, a second table 23 for storing the correlated zone ID 32 with the identity of the MT 12 (MT ID 112) and a third table 26 that contains filter identifiers filter 113, condition of application of filters identifiers (condition 115) such as on which service to apply the filter and action to be taken on packet data (action 117). Tables 23, 26 and 30 may comprises more than one entry if a session for more than one MT is managed by the PDSN 16.

Reference is now made to FIG. 3, which is a nodal operation and signal flow diagram illustrating a flow of messages for restricting geographical use of a packet data service for an unauthorized MT in the packet data telecommunications network 100 in accordance to a first embodiment of the invention. Reference is also made to FIG. 4, which describes a flow chart of the steps of the method for restricting geographical use of a packet data service in the packet data telecommunications network for an unauthorized MT in accordance to the first embodiment of the invention.

At step 402, the MT 12 is located in the packet data cell 5 and sends an origination request message 102 to the AN 14 over the air interface for requesting packet data service. The origination request message includes a cell information 108 can be information that relates to the location of the MT 12 like a packet data zone ID or a cell ID and usual parameters for identifying the MT 12. For example, in a CDMA2000 network the cell information may consist of a location information in the form of an Internet Protocol (IP) address for identifying the AN 14 serving the MT. Upon reception of the origination request message 102, the AN 14 sends a registration request 106 to the PDSN 16 (step 404). The registration request 106 comprises cell information 108.

When the PDSN 16 receives the registration request 106 at the I/O unit 20 (step 406), the processor 21 processes the registration request 106 and stores the cell information 108 in the first table 30 in the database 22 (step 408). At step 409, the processor 21 translates the cell information 108 from cell information to Current Zone ID. More precisely, the processor 21 translates this information into a zone ID 32. This translation process may take place locally in the PDSN 16 or remotely if the PDSN 16 makes a request an external database (not shown) to perform this translation.

At step 410, the PDSN 16 sends from the I/O unit 20 an access request message 110 to the AAA server 18 for authenticating the MT 12. The access request message 110 includes may includes parameters such as a MT ID 112 for identifying the MT 12. When the AAA server 18 receives the access request message 110, the AAA server 18 retrieves the MT 12 user profile and verifies if the MT 12 is authorized to operate on the network 100 (step 412).

Following this verification, the AAA server 18 sends an access accept message 114 to the PDSN 16 (step 414). The access accept message 114 comprises an allowance information parameter 116, which can be a PTT Zone allowance parameter for representing a defined geographic area and an IP filter ID. The IP filter ID is be defined in the PDSN in table 26 to take a certain action 29 on IP packets satisfying specific a certain condition 28. For example, the action may be to drop packet data with a specific destination IP address of a PTT server. The access response message is received at the I/O unit 20, at step 416.

After being authenticated by the AAA server 18, the registration takes place prior determining whether or not packet data for the requested service will go through. Thus, in order to complete the registration of the MT 12, the PDSN 16 sends through the I/O unit 20 a registration response message 118 to the AN 14 for responding to the registration request message 106 (step 418). The AN 14 then informs the MT 12 with an origination response message 122 for responding to the origination request 102 (step 420). Following the reception of the origination response message 122, a packet data connection 126 is established for transmitting packet data between the MT 12, the AN 14 and the PDSN 16 and further the Internet, Public/Private networks and PTT server 19 (step 422). A user of the MT 12 may press a button or key (not shown) on the MT 12 for communicating in a half-duplex call with another user and that this operation may happen at any time during the registration. However, a connection between the MT 12 the AN 14, the PDSN 16 and a PTT server has to be established before the MT 12 can send or receive packet data.

At step 424, the processor 21 compares the allowance with the zone information stored in the first table 23 (step 418 and 420). If the allowance information 116 is different from the zone ID 32 in the first mapping table 23, the PDSN 16 applies the IP Filter ID 113 to drop all packet data destined to a specified PTT destination IP address (PTT server 19). More precisely, packets destined towards the PTT server 19 will be dropped and the packet data for the service do not go through the connection 126.

At step 428, the PDSN 16 set up and applies the filter 113 (step 430). For example, if the filter 113 is applied to PTT service the PTT service is rejected and packet data from the MT 12 to the PTT server and vice versa are dropped because the MT 12 is outside a predetermined allowed geographic area for receiving PTT service (step 432). The user of the MT 12 can be informed in a certain manner on the reason why the service is not provided.

However, if the allowance information 116 matches the stored values in the first mapping table 23, at step 420, the packet data service is allowed to the MT 12 and packet data can be routed from and to the MT 12. This means that a packet service like the PTT service is allowed because the MT 12 is located inside a predetermined geographic area for receiving PTT service and packets destined to the PTT server will be allowed to go through on a connection between the MT 12, the AN 14, the PDSN and further a PTT server 20 connected to the PDSN 16.

Alternatively, a service code identifying a type of service requested may be sent from the MT 12 to the PDSN 16. Reference is now made to FIG. 5, which describes a flow chart of the steps of the method for restricting geographical use of a packet data service in the packet data telecommunications network for an unauthorized MT in accordance to the second embodiment of the invention. In FIG. 5, the origination request message 102 sent from the MT 12 to the AN 14 may comprise a service code parameter 109 for indicating a request packet data service (step 502). This packet data service may be identified as a PTT service.

Upon reception of the origination request 102, the AN 14 sends a registration request 106 to the PDSN 16 (step 504). The registration request 106 comprises cell information 108 and the service code 109. The origination request message includes a cell information 108 can be information that relates to the location of the MT 12 like a packet data zone ID or a cell ID and usual parameters for identifying the MT 12. When the PDSN 16 receives the registration request message 106 at the I/O unit 20 (step 506), the processor 21 processes the registration request 106 and stores the cell information 108 in the first table 30 in the database 22 (step 508). At step 509, the processor 21 translates the cell information 108 from cell information to Current Zone ID. More precisely, the processor 21 translates this information into a zone ID 32. This translation process may take place locally in the PDSN or remotely if the PDSN makes a request an external database (not shown) to perform this translation.

At step 510, the PDSN 16 sends from the I/O unit 20 an access request message 110 to the AAA server 18 for authenticating the MT 12. The access request message 110 includes may includes parameters such as a MT ID 112 for identifying the MT 12. When the AAA server 18 receives the access request message 110, the AAA server 18 retrieves the MT 12 user profile and verifies if the MT 12 is authorized to operate on the network 100 (step 412).

Following this verification, the AAA server 18 sends an access accept message 114 to the PDSN 16 (514). The access accept message 114 comprises an allowance information parameter 116, which can be a PTT Zone allowance parameter representing a defined geographic area.

At step 518, the processor 21 compares the allowance with the zone information stored in the first table 23 (step 520). If the allowance information 116 is different from the zone ID 32 in the first mapping table 23 and since a service code 109 has been received at step 506, the call is terminated (step 536). In particular, the PDSN 16 rejects the registration request and sends from the I/O unit 20 a registration response 118 with reject indicator 537 to the AN 14 to indicate to the MT 12 that the packet data service is rejected because the MT 12 is outside a predetermined allowed geographic area for receiving PTT service (step 538). The AN 14 then informs the MT 12 with an origination response message 122 that contains the same reject parameter 120 (step 540).

However, if the allowance information 116 matches the stored values in the first mapping table 23, at step 520, the packet data service is allowed to the MT 12 and packet data can be routed from and to the MT 12. This means that a packet service like the PTT service is allowed because the MT 12 is located inside a predetermined geographic area for receiving PTT service and packets destined to the PTT server will be allowed to go through on a connection between the MT 12, the AN 14, the PDSN and further a PTT server 20 connected to the PDSN 16. Steps 522, 524 and 526 are similar to steps 418, 420 and 422 respectively.

It can be understood that some messages and therefore some parameters sent from the MT 12 to the packet data network 100 and vice versa are not mentioned nor described for clarity reasons. Also some messages and therefore some parameters sent between network elements in the packet data network 100 are omitted for clarity reasons. More particularly, it should also be understood that FIGS. 1-5 depict a simplified packet data network 100, and that many other network elements have been omitted for clarity reasons only.

While the invention has been particularly shown and described with reference to the preferred embodiments thereof, it will be understood by those skilled in the art that various alterations may be made therein without departing from the spirit and scope of the invention.

What is claimed is:

1. A method of restricting geographical use of a service for a mobile terminal (MT) in a packet data network, the method comprising the steps of:

receiving, at a packet data service node (PDSN) from an access node (AN), a registration request message for requesting packet data service, wherein the registration request includes a cell information;

translating, at the PDSN, the cell information into a zone ID;

storing, at the PDSN, the zone ID, wherein the zone ID is stored in a first table;

sending, from the PDSN to an Authentication, Authorization, Accounting (AAA) server, an access request message for authenticating the MT;

receiving, at the PDSN from the AAA server, an access accept message for authorizing the MT to receive packet data service, wherein the access accept message includes an allowance information;

comparing, at the PDSN, the allowance information with the zone ID:

if the allowance information is different from the zone ID in the first table:

setting up, at the PDSN, a filter for the MT; and rejecting, at the PDSN, the packet data for the requested packet data service.

2. The method of claim 1, wherein the following steps are executed prior the step of receiving the registration request message for requesting packet data service:

sending, from the MT to the AN, an origination request for requesting a packet data service to the packet data network, wherein the registration request includes the cell information; and receiving, at the AN, the origination request sent from the AN.

3. The method of claim 1, step of receiving the registration request message for requesting packet data service includes the steps of:

processing, at the PDSN, the MT information;

accessing, at the PDSN, a first table for correlating the cell information and zone ID.

4. The method of claim 1, wherein the step of translating includes a step of correlating the cell information with zone ID of a second table.

5. The method of claim 1, wherein the step of sending an access request message from the PDSN to the AAA server includes the steps of:

receiving, at the AAA server, the access request;

verifying, at the AAA server, that the MT is allowed to received services in the packet data network; and sending, from the AAA server to the PDSN from the AAA server, an access accept message for authorizing the MT to receive packet data service, the access accept message includes the allowance information.

6. The method of claim 1, wherein the step of sending from the PDSN to the AN the registration response indicating that the service is allowed includes the steps of:

receiving, at the AN, the registration response;

sending from the AN to the MT an origination response;

establishing, between the MT and the PDSN, a packet data connection for transmitting packet data for the MT.

7. The method of claim 1, wherein the step of setting up a filter includes the steps of:

applying, at the PDSN, the filter based on condition and action stored in a third table.

8. The method of claim 1, wherein if the allowance information corresponds to the translated cell information in a first mapping table during the step of comparing:

sending, from the PDSN to the AN, a registration response message indicating that the service is allowed;

sending, from the AN to the MT, an origination response message indicating that the service is allowed; and establishing, between the MT and the PDSN, a packet data connection for transmitting packet data for the MT.

9. The method of claim 2, wherein the step of sending, from the MT to the AN, the origination request includes the steps of:

sending, from the AN to the PDSN, a service code for identifying the requested service:

if the allowance information is different from the zone ID in the first table:

terminating, at the PDSN, the packet data service;

rejecting, at the PDSN, the registration request message;

sending, from the PDSN to the AN, a registration message indicating that the requested service is rejected; and sending, from the AN to the PDSN, a registration message indicating that the requested service is rejected.

10. A Packet Date Service Node (PDSN) for providing packet data service to a Mobile Terminal (MT) in a packet data network, wherein the PDSN comprises:

an Input/Output unit for receiving a registration request message for requesting packet data service, wherein the registration request includes a cell information, receiving an access accept message for authorizing the MT to receive packet data service, wherein the access accept message includes an allowance information;

a database; and a processor for translating the cell information into a zone ID, comparing, at the PDSN, the allowance information with the zone ID and, if the allowance information is different from the zone ID in a first table stored in the database, the processor sets up a filter for the MT and rejects the packet data for the requested packet data service.

11. The PDSN of claim 10, wherein the database further comprises a second table for correlating the cell information with zone ID.

12. The PDSN of claim 10, wherein the processor further applies the filter based on condition and action stored in a third table of the database.

13. The PDSN of claim 10, wherein the I/Q unit receives from the AN the registration request message with a service code for identifying the requested service and if the allowance information is different from the zone ID in the first table:

the processor:

terminates, the packet data service;

rejects the registration request message; and the I/O unit:

sends a registration message indicating that the requested service is rejected.

* * * * *

UNITED STATES PATENT AND TRADEMARK OFFICE
CERTIFICATE OF CORRECTION

| | | |
|---|---|---|
| PATENT NO. | : 7,554,942 B2 | Page 1 of 1 |
| APPLICATION NO. | : 11/395201 | |
| DATED | : June 30, 2009 | |
| INVENTOR(S) | : Joong et al. | |

It is certified that error appears in the above-identified patent and that said Letters Patent is hereby corrected as shown below:

In Column 10, Line 15, in Claim 13, delete "I/Q" and insert -- I/O --, therefor.

Signed and Sealed this

Twenty-second Day of December, 2009

David J. Kappos
*Director of the United States Patent and Trademark Office*